UNITED STATES PATENT OFFICE.

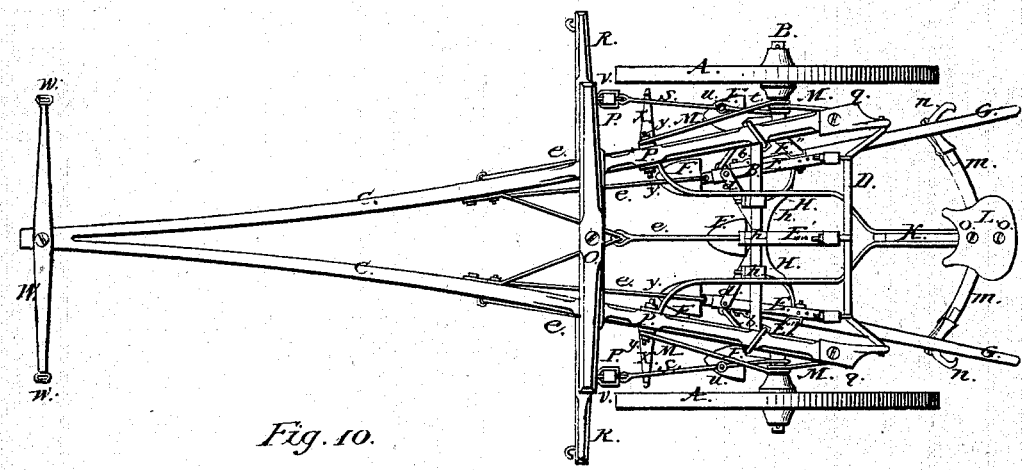
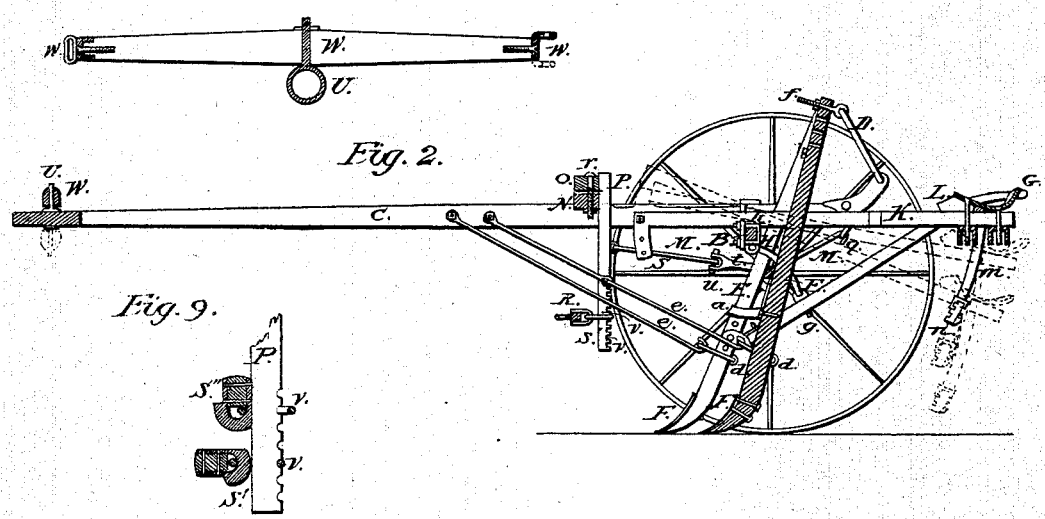

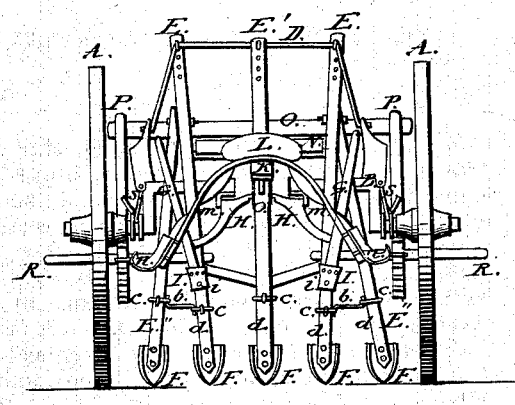
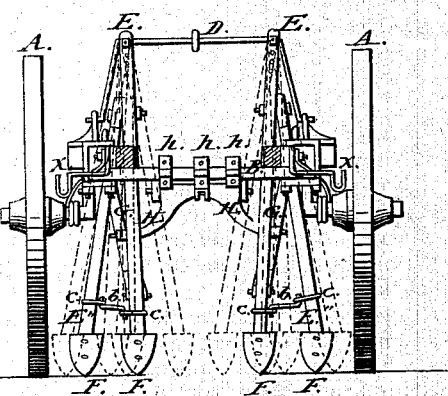
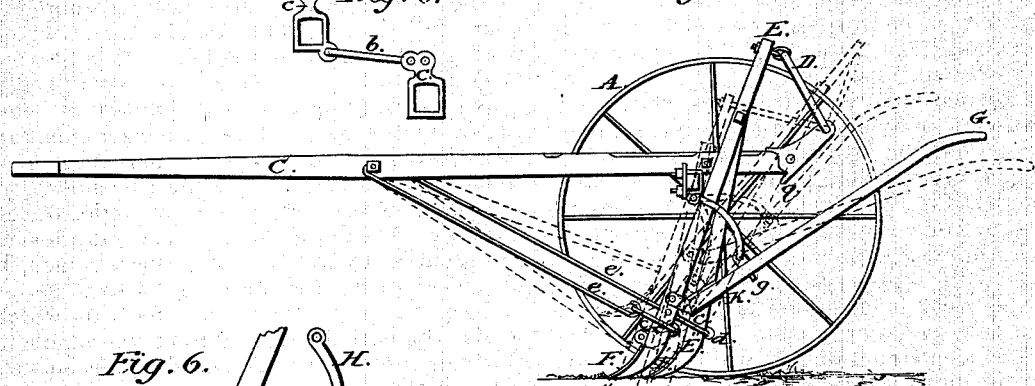
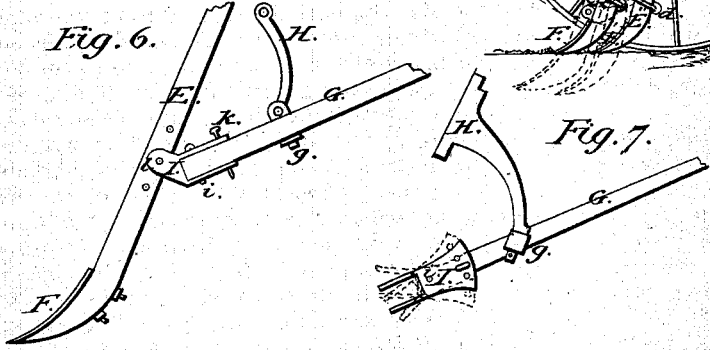

GEORGE R. RICHARDSON, OF EARLVILLE, AND JACOB BEHEL, OF ROCKFORD, ILLINOIS.

IMPROVEMENT IN CULTIVATORS.

Specification forming part of Letters Patent No. 139,478, dated June 3, 1873; application filed November 9, 1869.

*To all whom it may concern:*

Be it known that we, GEORGE R. RICHARDSON, of Earlville, La Salle county, and JACOB BEHEL, of Rockford, Winnebago county, Illinois, have invented certain Improvements in Cultivators, of which the following is a specification:

Our invention relates to that class of machines commonly known as "sulky" cultivators, which are more especially designed for cultivating crops that are planted in checkrows or drills, such as corn, beans, potatoes, and other similar crops; but which are also used for stirring land preparatory to sowing, and for covering seeds after they have been sown, and other purposes to which they are applicable. The subject-matter claimed is hereinafter specified.

In the accompanying drawings, Figure 1 is a plan view of a cultivator embodying our invention, and the best way now known to us; Fig. 2, a vertical longitudinal section therethrough; Fig. 3, a rear elevation thereof; Fig. 4, a front elevation, partly in section, in which the seat-support, saddle, and center-shovel, with its appendages, are omitted; Fig. 5 is a vertical longitudinal sectional view, in which the seat-support and saddle, also the center shovel-standard and whiffletrees, with their appendages, are omitted. Fig. 6, 7, 8, 9, and 10 are enlarged views of detached portions of the machine.

The dotted lines in the different figures represent some of the possible positions of the parts.

Wheels A are mounted on the crank-arms of an axle, B, as common in this class of machines. Tongue-timbers C, united in front, diverge backward and extend behind the axle to which they are securely fastened. An angular bail formed brace, D, is pivoted to these timbers. Shovel-standards E E' E'' are pivoted at top to this bail by eyebolts *f*, which form swivel-joints. The standards can be adjusted vertically by means of a series of holes in them, through one of which the eye-bolts pass. These inner shovel-standards are connected together by hinged links or stays *a*. The outer standards E'' are hinged at their upper ends to the inner standard E, and each is connected to its respective inner standard near its lower end, by a link, *b*, hinged to loops *c*, embracing the standards, as shown in Fig. 8, which also illustrates the relative position of the standards and the shovels F mounted on their lower ends. These loops, it will be observed, project in advance of the standard far enough to afford a point of attachment for the link-rods *e* which connect the draft-frame or tongue with the loops, and to balance the side draft upon the shovels, thus preventing their tendency to turn on their own axis. The connections above described, being flexible, insure a coincident movement of the shovels, while allowing their complete control by means of the hand-levers, and assisting in passing obstructions. Hand-levers G are connected by swivel-joints or fulcrum-pins *g* to swinging arms H, mounted in bearings *h* on the axle. These fulcrum-pins can be adjusted on the levers by inserting them in one of the series of holes therein, thus varying the leverage, and also the elevation of the handles. The lower ends of the hand-levers are secured by pivots *i* in a socket-clasp, I, of clevis-form, and provided with a series of holes for the reception of pins *k*, by which means the horizontal relation of the handle to the standards can be varied. The socket-clasp is also bifurcated in front of the pivot *i*, its jaws being vertical, so as to embrace the sides of the standards, and is also turned upward at an angle of about forty-five degrees relatively to the handle, or one sufficient to suit the backward inclination of the shovel-standards. The jaws are secured to the standard by a pin, *l*, which point of connection may be adjusted up or down by means of a series of holes, as usual. The details of these devices are shown in Figs. 6 and 7, and by them the hand-lever may be adapted for use by the operator whether riding or walking. A seat-supporting frame, K, is formed of metal bars set up edgewise, provided at their forward ends with adjusting holes, through which bolts *y* pass, and by which the frame may be adjusted vertically. This frame is bolted to the tongue-timbers in advance of the axle which it crosses, and extends behind the rear line of the wheels. The seat L rests upon the rear end of this frame, is of saddle-form, provided with rigid stirrups $m$ and adjustable foot-rests $n$, and is held in position by pins $o$ passing down through the frame. The seat can be adjusted backward or forward on its frame, and may also be rocked on a central support to accommodate the operator. Truss-braces M, secured to the tongue-timbers both in front and rear of the axle, and to the bent portions of the axle, serve to stiffen the frame. An evener, O, is pivoted centrally on a cross-brace, N, secured to the tongue-timbers C. Perpendicular eveners P are link-jointed to the horizontal evener O, and connected to the axle B by draft-links S, supported by hooks $x$ near the eveners. The draft-links are not rigidly connected with the axle, but are united by frangible pins $u$ with arms $t$, so that they may break when subjected to undue strain, and thus prevent injury to the machine. A hook-shaped clip, S', Fig. 9, is secured to the center of each single-tree, and unites the vertical evener P with the single-tree by a link, V. The evener is provided with a series of notches, in which the link V takes. The clip is provided with a flat side, thinner than its rear edge, so that by turning the single-tree up vertically the link V is loosened, and the single-tree can then be adjusted up or down on the evener, as at S'', Fig. 9; but when turned down to its natural position the thick rounded part of the clip forces it away from the evener and holds the link securely in place, as at S', Fig. 9.

By combining the rocking tail shovel-standards and draft-rods as I have done, the shovels are free to be moved laterally, and their tendency is to run at an uniform depth beneath the surface; and by the hand-lever and swivel-link arrangement the shovels cannot only be set at an angle to the line of draft, but can also readily be raised or lowered, by an attendant, who may, at his own choice, either ride or walk. The socket-clasp also serves a good purpose in adjusting the shovels to the line of draft, while the loops compel the shovels to move together without impeding their individual adjustment.

We claim as our invention—

1. The combination of the rocking-bail D, pivoted on the tongue-timbers C, the inner shovel-standards E swiveled on the rocking-bail, outer shovel-standards E'', each pivoted to its respective inner standard at top, and connected with it by a link, $b$, near the bottom, and draft-rods $e$ connecting each standard with the tongue-timbers, these members being constructed and operating substantially as set forth.

2. The combination of shovel-standards E, swiveled on a rocking-bail, D, with hand-levers G pivoted to the standards and suspended from the main frame by a swivel-link, H, these members being constructed and operating substantially as set forth.

GEO. R. RICHARDSON.
JACOB BEHEL.

Witnesses:
G. L. CHAPIN,
E. E. GIBSON.